United States Patent
Yang

(10) Patent No.: US 7,414,685 B2
(45) Date of Patent: Aug. 19, 2008

(54) TRANSFLECTIVE FRINGE FIELD SWITCHING LIQUID CRYSTAL DISPLAY

(75) Inventor: Chiu-Lien Yang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 409 days.

(21) Appl. No.: 10/997,666

(22) Filed: Nov. 24, 2004

(65) Prior Publication Data

US 2005/0128389 A1    Jun. 16, 2005

(30) Foreign Application Priority Data

Dec. 12, 2003    (CN) .................... 2003 1 0112579

(51) Int. Cl.
*G02F 1/1335* (2006.01)

(52) U.S. Cl. ............................................. 349/114

(58) Field of Classification Search ............. 349/141, 349/113–114

See application file for complete search history.

(56) References Cited

U.S. PATENT DOCUMENTS

| 6,583,842 | B2 | 6/2003 | Hong et al. | |
|---|---|---|---|---|
| 6,650,385 | B1 * | 11/2003 | Liu | 349/113 |
| 6,914,656 | B2 * | 7/2005 | Sakamoto et al. | 349/141 |
| 2005/0128390 | A1 * | 6/2005 | Yang | 349/114 |
| 2005/0190324 | A1 * | 9/2005 | Yang | 349/114 |
| 2006/0256264 | A1 * | 11/2006 | Yang et al. | 349/114 |

* cited by examiner

*Primary Examiner*—Dung T. Nguyen
(74) *Attorney, Agent, or Firm*—Wei Te Chung

(57) ABSTRACT

A liquid crystal display (2) includes: a first substrate (20); a second substrate (22); a liquid crystal layer (21) between the first substrate and the second substrate; and a plurality of pixel regions each defined by respective pixel electrodes (224) and a common electrode (222), for application of a voltage to the liquid crystal layer and formation of a fringe electric field at each pixel region. Each pixel region includes a transmissive region (R) and a reflective region (T). A thickness of the liquid crystal layer in the transmissive region is greater than a thickness of the liquid crystal layer in the reflective region.

3 Claims, 3 Drawing Sheets

TRANSFLECTIVE FRINGE FIELD SWITCHING LIQUID CRYSTAL DISPLAY

BACKGROUND OF THE INVENTION

1. Field of the Invention

The present invention relates to liquid crystal displays, and especially to a transflective fringe field switching liquid crystal display (FFS LCD).

2. Description of the Prior Art

Recently, liquid crystal displays have become widely used in computer and communication products such as notebooks, cell phones and personal digital assistants. This is largely due to the thinness, lightness, and low power consumption of liquid crystal displays. Usually a liquid crystal display needs a planar light source, such as a backlight module, to display images. The backlight module is the main power consuming component of the liquid crystal display. In order to reduce power consumption, reflective type liquid crystal displays have been developed. A reflective liquid crystal display uses natural light beams to provide a planar light source. However, conventional reflective liquid crystal displays have some limitations; for example, a long response time and a narrow view angle.

To resolve the above-mentioned problems, a reflective fringe field switching liquid crystal display (FFS LCD) is described in U.S. Pat. No. 6,583,842 issued on Jun. 24, 2003. As represented in FIG. 4, the FFS LCD 1 includes a first substrate 10, a second substrate 12, and a liquid crystal layer 11 interposed between the substrates 10, 12.

The first substrate 10 comprises a first glass sheet 101 and a first alignment film 102. The first alignment film 102 is adhered on one surface (not labeled) of the first glass sheet 101, the surface facing the liquid crystal layer 11.

The second substrate 12 comprises a second glass sheet 121, a common electrode 122, an insulating layer 123, a plurality of pixel electrodes 124, and a second alignment film 125. The second glass sheet 121, the common electrode 122, and the insulating layer 123 are stacked from bottom to top in the order. The pixel electrodes 124 are formed on the insulating layer 123, and are spaced apart from and parallel to each other. The common electrode 122 is uniformly formed on the second glass sheet 121, and is made of a high reflectivity metal such as aluminum. Therefore, the common electrode 122 functions as both an electrically conductive electrode and a reflector.

The reflective FFS LCD 1 can efficiently use natural light beams, due to the reflection of the common electrode 122. Thus power consumption is reduced. Also, the common electrode 122 and the pixel electrodes 124 are both formed on the second substrate 12, which provides a dense fringe electric field parallel to the second substrate 12. The fringe electric field yields a fast response time and a wide view angle.

However, when the ambient environment is dark, the reflection of ambient light by the common electrode 122 is limited. The visibility of the reflective FFS LCD display 1 is poor. Conversely, a transmission type liquid crystal display is disadvantageous when the ambient environment is bright.

An improved liquid crystal display which overcomes the above-mentioned problems and shortcomings is desired.

SUMMARY OF THE INVENTION

An object of the present invention is to provide a liquid crystal display which can be used not only in a bright environment but also in a dark environment, and which has a wide viewing angle.

To achieve the above object, a liquid crystal display of the present invention comprises: a first substrate; a second substrate; a liquid crystal layer between the first substrate and the second substrate; and a plurality of pixel regions each defined by respective pixel electrodes and a common electrode, for application of a voltage to the liquid crystal layer and formation of a fringe electric field at each pixel. Each pixel region includes a transmissive region and a reflective region. A thickness of the liquid crystal layer in the transmissive region is greater than a thickness of the liquid crystal layer in the reflective region.

Other objects, advantages and novel features of the present invention will be apparent from the following detailed description of preferred embodiments thereof with reference to the attached drawings, in which:

DETAILED DESCRIPTION OF THE PRESENT INVENTION

Figure 1:
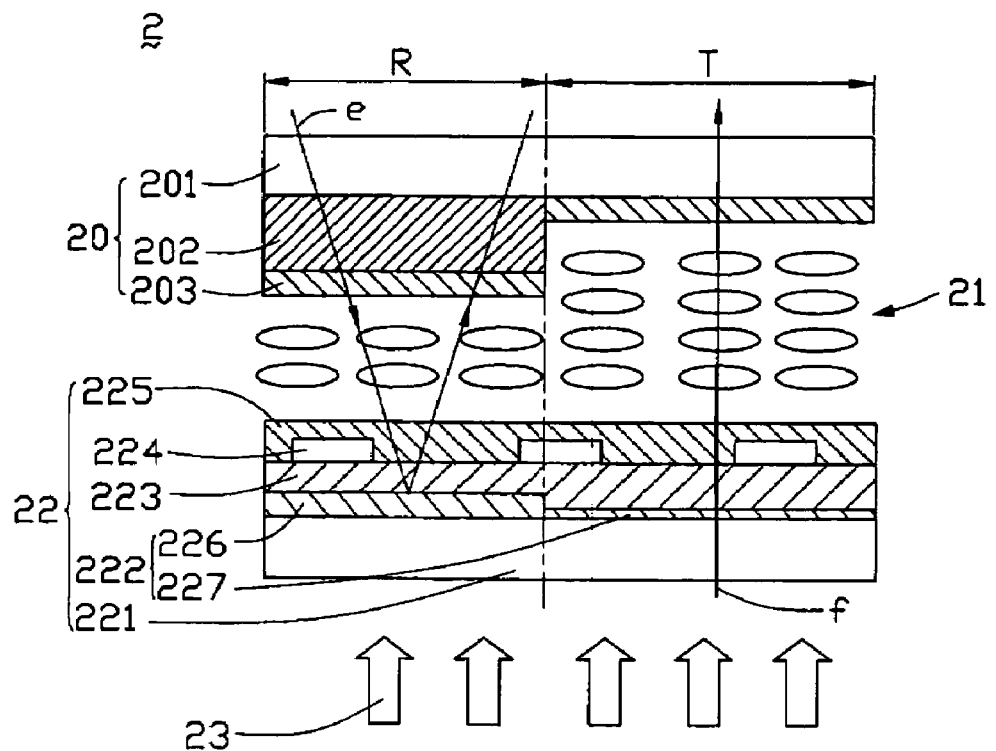
FIG. 1 is a schematic, side cross-sectional view of one sub-pixel area of a transflective FFS LCD according to a first embodiment of the present invention.

FIG. 1 is a view of one sub-pixel area of a transflective FFS LCD 2 according to the first embodiment of the present invention. The transflective FFS LCD 3 includes a first substrate 20, a second substrate 22, a liquid crystal layer 21, and a backlight module (not shown). The liquid crystal layer 21 is interposed between the first substrate 20 and the second substrate 22, and the backlight module is located below the second substrate 22.

The first substrate 20 has a first glass sheet 201, a passivation layer 202, and a first alignment film 203. The whole passivation layer 202 is a part of the reflective region R, and is formed on the first glass sheet 201. The first alignment film 203 covers the passivation layer 202 and the first glass sheet 201, and faces the liquid crystal layer 21.

The thickness of the liquid crystal layer 21 in the reflective region R is half the thickness of the liquid crystal layer 21 in the transmissive region T. This configuration can be obtained by configuring the thickness of the passivation layer 202 appropriately. With the different thicknesses, light beams 'e' from the outside environment and light beams 'f' from the backlight module traverse a same optical distance when they pass through the transflective FFS LCD 2.

The second substrate 22 includes a second glass sheet 221, a common electrode 222, an insulating layer 223, a plurality of pixel electrodes 224, and a second alignment film 225. The second glass sheet 221, the common electrode 222, the insulating layer 223, and the pixel electrodes 224 are stacked from bottom to top in that order. A plurality of pixel regions is defined by the pixel electrodes 224 and the common electrode 222, the electrodes 224, 222 being for applying a voltage to the liquid crystal layer 21. Each of the pixel regions includes a transmissive region T and a reflective region R. Light reflected in the reflective region R and light transmitted through the transmissive region T is utilized in displaying an image.

The pixel electrodes 224 are transparent strip electrodes, and are spaced apart from and parallel to each other. The common electrode 222 has a transmissive area 227 corresponding to the transmissive region T, and a reflective area 226 corresponding to the reflective region R. The common electrode 222 is made of aluminum, and a transmission ratio of the aluminum film depends on a thickness thereof. When the thickness is equal to 100 nanometers, the transmission ratio is 1%. If the thickness is decreased, the transmission ratio increases, and vice versa. Therefore, the thickness of the reflective area 226 is defined as being more than 100 nanometers, and the thickness of the transmissive area 227 is defined as being less than 100 nanometers. Thus the reflective area 226 can reflect natural light beams from the outside environment, and light beams 23 from the backlight module can pass through the transmissive area 227. In other words, the transflective FFS LCD 2 can be used in dark conditions and also in bright conditions.

The transmissive area 227 of the aluminum film has a higher impedance than the reflective area 226, because the thickness of the transmissive area 227 is less than that of the reflective area 226. In order to decease the impedance of the transmissive area 227, an indium tin oxide film (not shown) is attached to one surface of the transmissive area 227.

Figure 2:
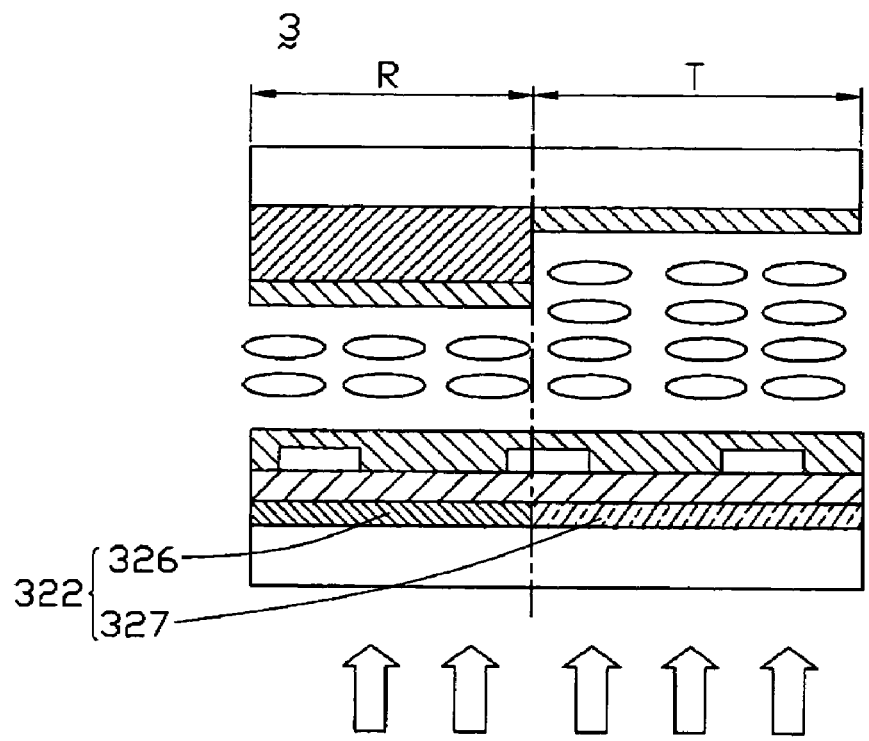
FIG. 2 is a schematic, side cross-sectional view of one sub-pixel area of a transflective FFS LCD according to a second embodiment of the present invention.

FIG. 2 is a view of one sub-pixel area of a transflective FFS LCD 3 according to the second embodiment of the present invention. Unlike the transflective FFS LCD 2, the transflective FFS LCD 3 has a common electrode 322, and the common electrode 322 includes a reflective area 326 and a transmissive area 327. The reflective area 326 is made of a metal film; for example, an aluminum film. A thickness of the aluminum film is more than 100 nanometers. The transflective area 327 is an indium tin oxide film or an indium zinc oxide film. Each of the indium tin oxide film and the indium zinc oxide film is transparent.

Figure 3:
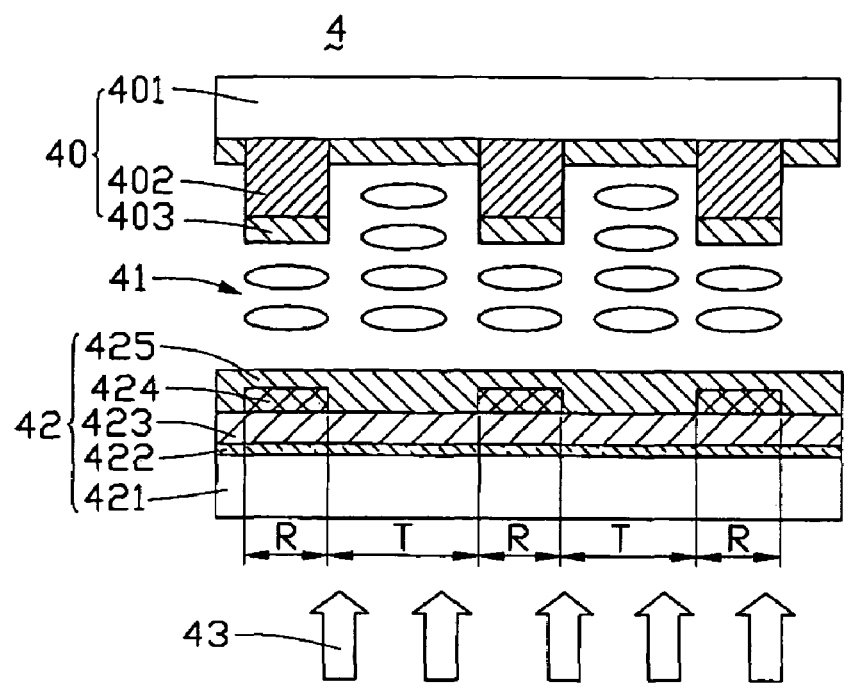
FIG. 3 is a schematic, side cross-sectional view of one sub-pixel area of a transflective FFS LCD according to a third embodiment of the present invention.

FIG. 3 is a view of one sub-pixel area of a transflective FFS LCD 4 according to the third embodiment of the present invention. The transflective FFS LCD 4 includes a first substrate 40, a second substrate 42, a liquid crystal layer 41, and a backlight module (not shown). The liquid crystal layer 41 is interposed between the first substrate 40 and the second substrate 42, and the backlight module is disposed below the second substrate 42. The transflective FFS LCD 4 can be considered as a combination of several transmissive regions T and reflective regions R.

The first substrate 40 includes a first glass sheet 401, a passivation layer 402, and a first alignment film 403. The passivation layer 402 is divided into several parts according to the corresponding reflective regions R. Said parts are disposed on the first glass sheet 401, and are spaced apart from and parallel to each other. The first alignment film 403 covers the passivation layer 402 and the first glass sheet 401.

The second substrate 42 includes a second glass sheet 421, a common electrode 422, an insulating layer 423, a plurality of pixel electrodes 424, and a second alignment film 425. The second glass sheet 421, the common electrode 422, and the insulating layer 423 are stacked from bottom to top in that order. The pixel electrodes 424 are formed on the insulating layer 423, and are spaced apart from and parallel to each other according to the corresponding reflective regions R. The second alignment film 425 covers the pixel electrodes 424 and the insulating layer 423.

The common electrode 422 is made of a transparent electrically conductive material. For example, the common electrode 422 can be an indium tin oxide film or an indium zinc oxide film. Light beams 43 from the backlight module can pass through the common electrode 422. The pixel electrodes 424 are made of an electrically conductive material having a high reflectivity, so that the pixel electrodes 424 act as reflective electrodes to reflect light beams from the outside environment.

Figure 4:
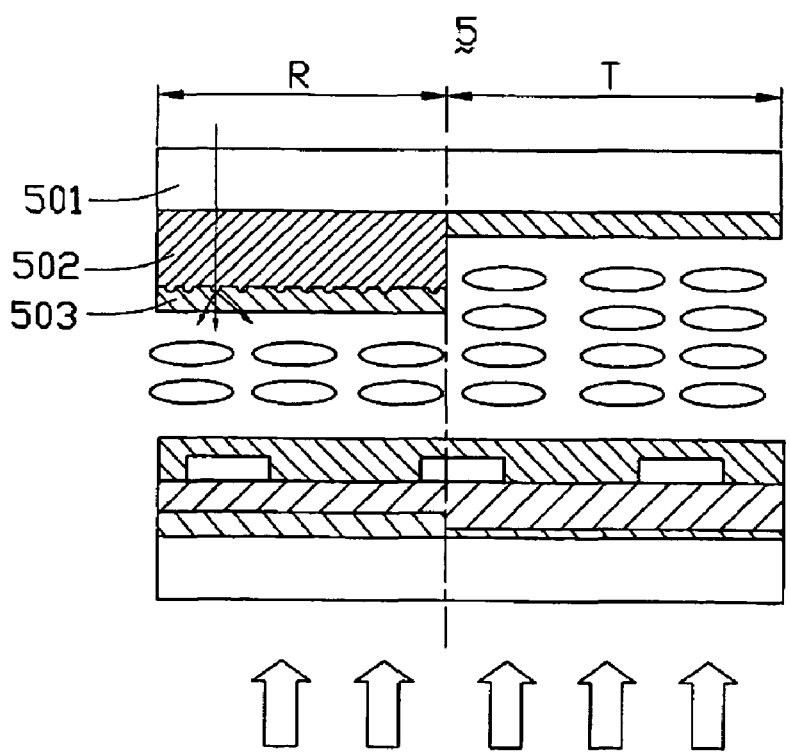
FIG. 4 is a schematic, side cross-sectional view of one sub-pixel area of a transflective FFS LCD according to a fourth embodiment of the present invention.
Figure 5:
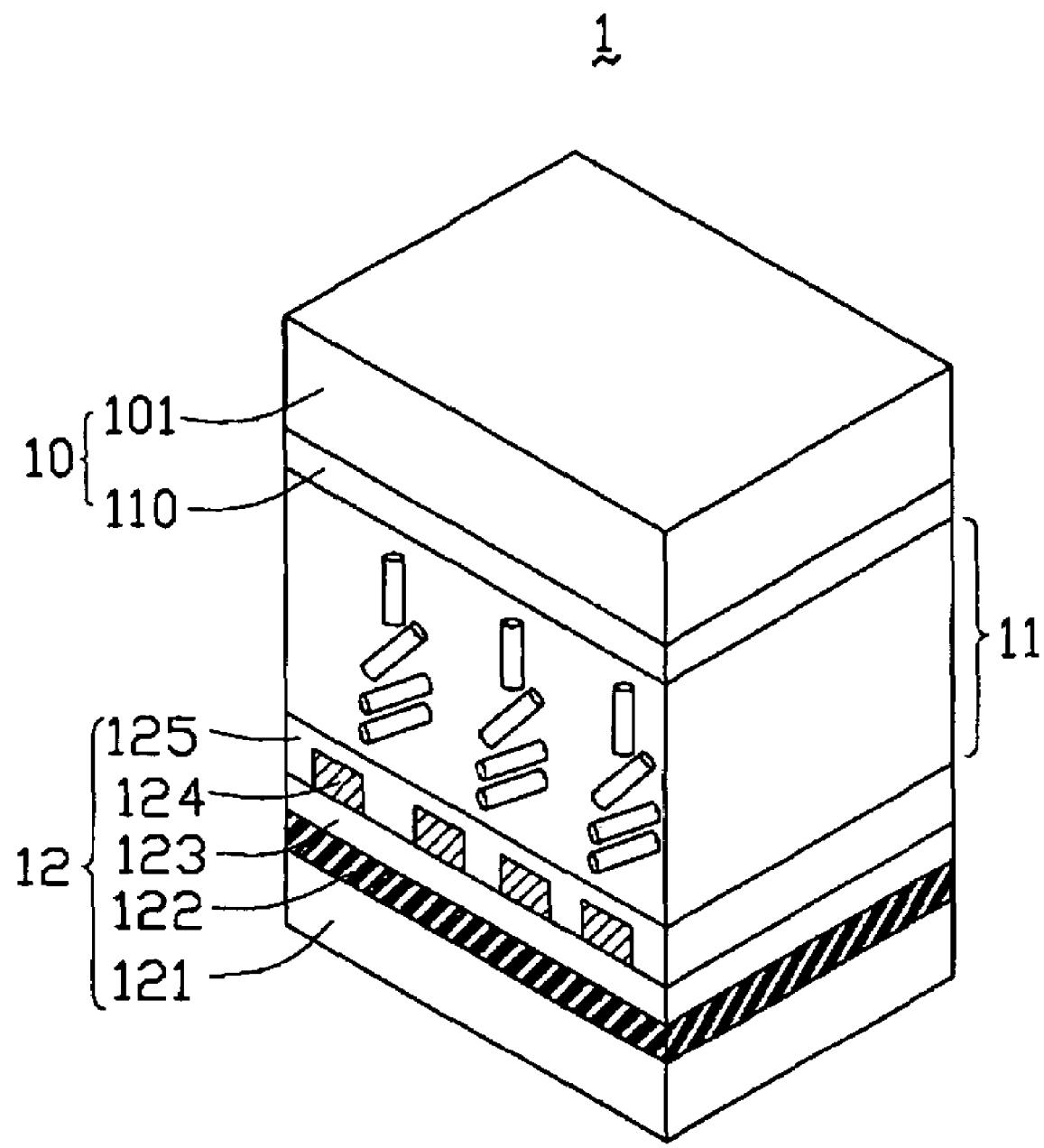
FIG. 5 is a schematic, stereo view of one sub-pixel area of a conventional FFS LCD.

FIG. 4 is a view of one sub-pixel area of a transflective FFS LCD 5 according to the fourth embodiment of the present invention. Unlike the transflective FFS LCD 2, the transflective FFS LCD 5 has a first glass sheet 501, a passivation layer 502, and a first alignment film 503. The passivation layer 502 is formed on the first glass sheet 501, and a plurality of bumps (not labeled) is defined on one surface of the passivation layer 502 that abuts the first alignment film 503. The first alignment film 503 covers the passivation layer 502 and the first glass sheet 501. The bumps can scatter light beams from the outside environment, in order to avoid the so-called mirror reflection effect.

The transflective FFS LCDs 2, 3, 4, 5 can effectively use light beams from the outside environment and from the respective backlight modules. Therefore, the transflective FFS LCDs 2, 3, 4, 5 can be used not only in bright conditions, but also in dark conditions.

While the present invention has been described with reference to particular embodiments, the descriptions are illustrative of the invention and are not to be construed as limiting the invention. Therefore, various modifications of the described embodiments can be made by those skilled in the art without departing from the true spirit and scope of the invention as defined by the appended claims.

What I claim is:

1. A liquid crystal display comprising:
   a first substrate;
   a second substrate;
   a liquid crystal layer between the first substrate and the second substrate; and
   a plurality of pixel regions each defined by respective pixel electrodes and a common electrode, for application of a voltage to the liquid crystal layer and formation of a fringe electric field at each pixel region;
   wherein each of the pixel regions includes a transmissive region and a reflective region, and a thickness of the liquid crystal layer at the transmissive region is greater than a thickness of the liquid crystal layer at the reflective region; and
   the common electrode is made of an aluminum film, and has a transmissive area corresponding to the transmissive region and a reflective area corresponding to the reflective region, a thickness of the transmissive area is less than 100 nanometers, and a thickness of the reflective area is more than 100 nanometers.

2. The liquid crystal display of claim 1, wherein the thickness of the liquid crystal layer in the reflective region is half the thickness of the liquid crystal layer in the transmissive region.

3. A liquid crystal display comprising:
   a first substrate;
   a second substrate;
   a liquid crystal layer between the first substrate and the second substrate;
   a plurality of pixel regions each defined by respective pixel electrodes and a common electrode, for application of a voltage to the liquid crystal layer and formation of a fringe electric field at each pixel region, wherein each of the pixel regions includes a transmissive region and a reflective region, and the common electrode has a plurality of transmissive areas corresponding to the transmissive regions of the pixel regions and a plurality of reflective areas corresponding to the reflective regions of the pixel regions; and a passivation layer positioned corresponding to the reflective regions of the pixel regions, the passivation layer disposed between the first substrate and liquid crystal layer;

wherein the common electrode is made of an aluminum film, and in each of the pixel regions, a thickness of the transmissive area is less than 100 nanometers, and a thickness of the reflective area is more than 100 nanometers.

* * * * *